US012766491B2

(12) United States Patent
Ichikawa et al.

(10) Patent No.: US 12,766,491 B2
(45) Date of Patent: Oct. 20, 2026

(54) HONEYCOMB STRUCTURE, EXHAUST GAS PURIFICATION DEVICE, AND PRODUCTION METHOD FOR HONEYCOMB STRUCTURE

(71) Applicant: NGK INSULATORS, LTD., Nagoya-City (JP)

(72) Inventors: Shuichi Ichikawa, Nagoya-City (JP); Yukio Miyairi, Nagoya-City (JP); Masaaki Masuda, Nagoya-City (JP); Takuya Ishihara, Tsushima City (JP)

(73) Assignee: NGK INSULATORS, LTD., Nagoya (JP)

( * ) Notice: Subject to any disclaimer, the term of this patent is extended or adjusted under 35 U.S.C. 154(b) by 756 days.

(21) Appl. No.: 18/327,116

(22) Filed: Jun. 1, 2023

(65) Prior Publication Data

US 2023/0321643 A1 Oct. 12, 2023

Related U.S. Application Data

(63) Continuation of application No. PCT/JP2021/036521, filed on Oct. 1, 2021.

(30) Foreign Application Priority Data

Dec. 2, 2020 (JP) ................................ 2020-200399

(51) Int. Cl.

| | |
|---|---|
| ***B01J 23/86*** | (2006.01) |
| ***B01D 53/94*** | (2006.01) |
| ***B01J 21/08*** | (2006.01) |
| ***B01J 35/33*** | (2024.01) |
| ***B01J 35/57*** | (2024.01) |
| ***B01J 37/02*** | (2006.01) |
| ***B01J 37/08*** | (2006.01) |

(Continued)

(52) U.S. Cl.

CPC ............ *B01J 23/862* (2013.01); *B01D 53/94* (2013.01); *B01J 21/08* (2013.01); *B01J 35/33* (2024.01);

(Continued)

(58) Field of Classification Search

CPC . B01J 23/862; B01J 35/57; B01J 35/33; B01J 21/08; B01J 37/0219; B01J 37/082; B01D 53/94; F01N 3/2013; F01N 3/2828

See application file for complete search history.

(56) References Cited

U.S. PATENT DOCUMENTS 9,488,085 B2 11/2016 Crawford et al.
12,121,886 B2 * 10/2024 Miyairi ................ B01D 53/885

(Continued)

FOREIGN PATENT DOCUMENTS

JP H11-336534 A 12/1999
JP 2011-246340 A 12/2011

(Continued)

OTHER PUBLICATIONS

International Search Report and Written Opinion (with English translation) dated Nov. 16, 2021 (Application No. PCT/JP2021/036521).

(Continued)

*Primary Examiner* — Yong L Chu

(74) *Attorney, Agent, or Firm* — Muncy, Geissler, Olds & Lowe, P.C.

(57) ABSTRACT

A honeycomb structure including: an outer peripheral wall; a partition wall disposed on an inner side of the outer peripheral wall, the partition wall defining a plurality of cells, each of the cells extending from one end face to other end face to form a flow path; and magnetic particles, wherein the magnetic particles contain secondary particles with primary particles combined, wherein in a cross-sectional image of the honeycomb structure, a ratio of a number of the primary particles forming the secondary particles to a total number of the primary particles of the magnetic particles is 40 to 100%, and wherein a particle size D50

(Continued)

corresponding to a cumulative frequency of 50% by number for the primary particles is 5 to 100 μm.

11 Claims, 7 Drawing Sheets

(51) Int. Cl.
*F01N 3/20* (2006.01)
*F01N 3/28* (2006.01)
(52) U.S. Cl.
CPC ........... *B01J 35/57* (2024.01); *B01J 37/0219* (2013.01); *B01J 37/082* (2013.01); *F01N 3/2013* (2013.01); *F01N 3/2828* (2013.01); *B01D 2255/9155* (2013.01); *B01J 2235/00* (2024.01); *B01J 2235/30* (2024.01); *F01N 2330/06* (2013.01); *F01N 2370/02* (2013.01)

(56) References Cited

U.S. PATENT DOCUMENTS

| | | | | |
|---|---|---|---|---|
| 2009/0146350 | A1 | 6/2009 | Noguchi et al. | |
| 2019/0323401 | A1* | 10/2019 | Miyairi | F01N 3/2828 |
| 2021/0115825 | A1 | 4/2021 | Miyairi et al. | |
| 2021/0291157 | A1 | 9/2021 | Miyairi et al. | |
| 2021/0324772 | A1 | 10/2021 | Miyairi et al. | |
| 2021/0346880 | A1 | 11/2021 | Miyairi et al. | |
| 2021/0388749 | A1 | 12/2021 | Kimata et al. | |

FOREIGN PATENT DOCUMENTS

| | | | | |
|---|---|---|---|---|
| JP | 2019-188272 | A | 10/2019 | |
| WO | 2008/026375 | A1 | 3/2008 | |
| WO | 2016/021186 | A1 | 2/2016 | |
| WO | 2020/031434 | A1 | 2/2020 | |
| WO | 2020/110396 | A1 | 6/2020 | |
| WO | 2020/188973 | A1 | 9/2020 | |
| WO | 2020/195278 | A1 | 10/2020 | |
| WO | WO-2020195108 | A1 * | 10/2020 | B01J 35/57 |

OTHER PUBLICATIONS

English translation of the International Preliminary Report on Patentability (Chapter 1) dated Jun. 15, 2023 (Application No. PCT/JP2021/036521).

* cited by examiner

HONEYCOMB STRUCTURE, EXHAUST GAS PURIFICATION DEVICE, AND PRODUCTION METHOD FOR HONEYCOMB STRUCTURE

FIELD OF THE INVENTION

The present invention relates to a honeycomb structure, an exhaust gas purification device, and a method for producing a honeycomb structure.

BACKGROUND OF THE INVENTION

As a measure to improve heating characteristics of conductors by induction heating, it is known that the heating characteristics can be improved by increasing frequency of an alternating current used, reducing a skin (penetration) depth at which eddy current flows, and increasing surface resistance of the conductor.

In order to induction-heat a honeycomb structure that is not a conductor, Patent Literature 1 proposes a configuration in which magnetic metal rods are inserted into cells of the honeycomb structure or magnetic materials are dispersed in the cells of the honeycomb structure.

Further, Patent Literature 2 proposes a configuration in which a plurality of metal particles or small pieces of a metal are partially filled in individual internal spaces of cells of a honeycomb structure.

Furthermore, Patent Literature 3 proposes a configuration in which a coating layer containing magnetic particles is provided on a surface of a partition wall of a honeycomb structure.

CITATION LIST

Patent Literatures

[Patent Literature 1] U.S. Pat. No. 9,488,085 B1
[Patent Literature 2] Japanese Patent Application Publication No. 2019-188272 A
[Patent Literature 3] WO 2020/031434 A1

SUMMARY OF THE INVENTION

In order to improve the heating characteristics of the honeycomb structure with a conductor by induction heating, it is desirable to increase the frequency of the current used, reduce the skin depth at which eddy current flows, and increase the surface resistance of the conductor arranged in the honeycomb structure, but as the skin depth decreases, the heating characteristics generally decrease. To address such problems, the present inventors have found that the heating characteristics are improved by good eddy current while increasing a size and thickness of a loop formed by the eddy current generated in the conductor site arranged in the honeycomb structure by induction heating, thereby reducing the skin depth at which the eddy current flows, and increasing the surface resistance of the conductor arranged in the honeycomb structure.

As a result of further studies, the present inventors have found that in order to increase the size of the loop formed by the eddy current generated in the conductive site arranged in the honeycomb structure by induction heating, it is effective to provide magnetic particles in the honeycomb structure and further control a ratio of the number of secondary particles of the magnetic particles.

An object of the present invention completed on the basis of the above findings relates to provide a honeycomb structure, an exhaust gas purification device, and a method for producing a honeycomb structure, which have improved heating characteristics by induction heating.

The above problems are solved by the following present invention. The invention is specified as follows:

(1)

A honeycomb structure comprising: an outer peripheral wall; a partition wall disposed on an inner side of the outer peripheral wall, the partition wall defining a plurality of cells, each of the cells extending from one end face to other end face to form a flow path; and magnetic particles, wherein the magnetic particles comprise secondary particles with primary particles combined, wherein in a cross-sectional image of the honeycomb structure, a ratio of a number of the primary particles forming the secondary particles to a total number of the primary particles of the magnetic particles is 40 to 100%, and wherein a particle size D50 corresponding to a cumulative frequency of 50% by number for the primary particles is 5 to 100 μm.

(2)

An exhaust gas purification device, comprising:

the honeycomb structure according to (1);

a coil provided on an outer periphery of the honeycomb structure; and a cylindrical member for holding the honeycomb structure.

(3)

A method for producing a honeycomb structure, comprising the steps of:

preparing a honeycomb substrate comprising: an outer peripheral wall; and a partition wall disposed on an inner side of the outer peripheral wall, the partition wall defining a plurality of cells, each of the cells extending from one end face to other end face to form a flow path;

providing the honeycomb substrate with a slurry containing magnetic particles;

degreasing the honeycomb substrate provided with the slurry containing the magnetic particles by a heat treatment at 400 to 700° C. for 1 to 10 hours; and after the degreasing, performing a heat treatment at 900 to 1400° C. for 0.5 to 10 hours in a vacuum or an inert atmosphere.

According to the present invention, it is possible to provide a honeycomb structure, an exhaust gas purification device, and a method for producing a honeycomb structure, which have improved heating characteristics by induction heating.

BRIEF DESCRIPTION OF THE DRAWINGS

FIG. 1 (B) is a schematic cross-sectional view of the honeycomb structure 10 parallel to the extending direction of the cells according to the embodiment of the present invention;

FIG. 2 (B) is a schematic cross-sectional view of the honeycomb structure 20 parallel to the extending direction of the cells according to the embodiment of the present invention;

FIG. 3 (B) is a schematic cross-sectional view of the honeycomb structure 30 parallel to the extending direction of the cells according to the embodiment of the present invention;

FIG. 4 (B) is a schematic cross-sectional view when the honeycomb structure 40 is cut along the line L-L shown in (A) in parallel with the extending direction of the cells;

DETAILED DESCRIPTION OF THE INVENTION

Hereinafter, embodiments of a honeycomb structure, an exhaust gas purification device and a method for producing a honeycomb structure according to the present invention will be described with reference to the drawings. However, the present invention is not limited to these embodiments, and various changes, modifications, and improvements may be made based on knowledge of those skilled in the art, without departing from the scope of the present invention.

<Honeycomb Structure>

Figure 1:
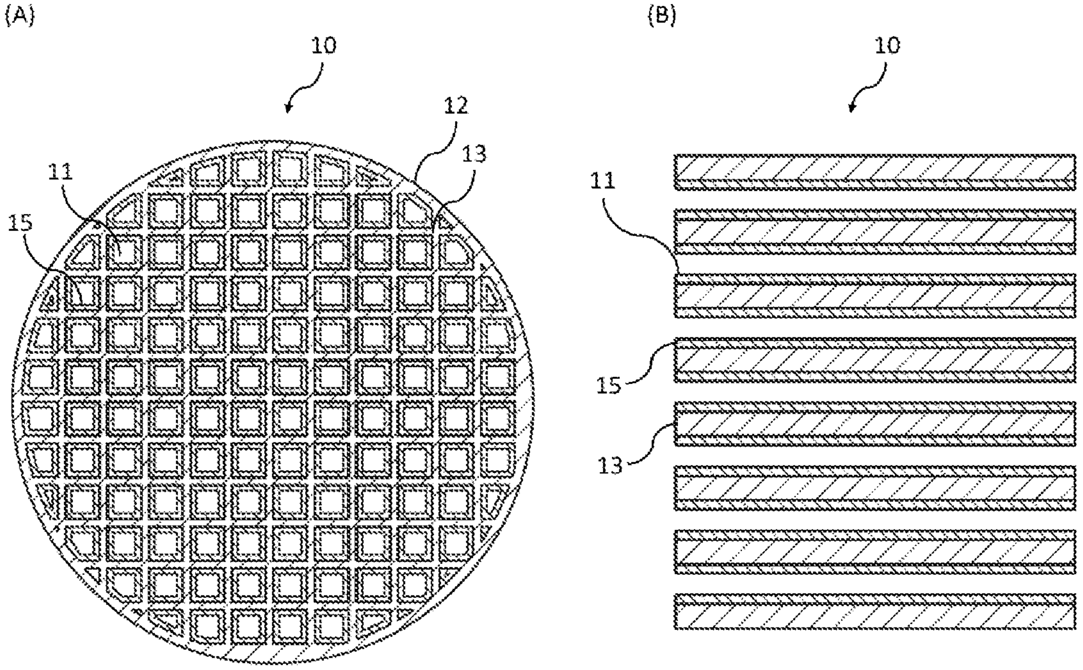
FIG. 1 (A) is a schematic cross-sectional view of a honeycomb structure 10 perpendicular to an extending direction of cells according to an embodiment of the present invention.

FIG. 1 (A) is a schematic cross-sectional view of a honeycomb structure 10 perpendicular to an extending direction of cells 11 according to an embodiment of the present invention. FIG. 1 (B) is a schematic cross-sectional view of the honeycomb structure 10 parallel to the extending direction of the cells 11 according to the embodiment of the present invention.

The honeycomb structure 10 includes: an outer peripheral wall 12; a partition wall 13 disposed on an inner side of the outer peripheral wall 12, the partition wall 13 defining a plurality of cells 11, each of the cells 11 extending from one end face to other end face to form a flow path; and magnetic particles.

Although materials of the partition wall 13 and the outer peripheral wall 12 of the honeycomb structure 10 are not particularly limited, they are typically formed of a ceramic material. Examples of the ceramic material include cordierite, silicon carbide, aluminum titanate, silicon nitride, mullite, alumina, a silicon-silicon carbide-based composite material, and silicon carbide-cordierite-based composite material, in particular, a sintered body mainly based on a silicon-silicon carbide composite material or silicon carbide. As used herein, the expression "silicon carbide-based" means that the partition wall 13 and the outer peripheral wall 12 of the honeycomb structure 10 contain silicon carbide in an amount of 50% by mass or more of the partition wall 13 and the outer peripheral wall 12 of honeycomb structure 10 as a whole. The phrase "the partition wall 13 and the outer peripheral wall 12 of the honeycomb structure 10 are mainly based on a silicon-silicon carbide composite material" means that the partition wall 13 and the outer peripheral wall 12 of the honeycomb structure 10 contain 90% by mass or more of the silicon-silicon carbide composite material (total mass) based on the partition wall 13 and the outer peripheral wall 12 of the honeycomb structure 10 as a whole. Here, for the silicon-silicon carbide composite material, it contains silicon carbide particles as an aggregate and silicon as a binding material for binding the silicon carbide particles, and a plurality of silicon carbide particles are preferably bonded by silicon so as to form pores between the silicon carbide particles. The phrase "the partition wall 13 and the outer peripheral wall 12 of the honeycomb structure 10 are mainly based on silicon carbide" means that the partition wall 13 and the outer peripheral wall 12 of the honeycomb structure 10 contain 90% by mass or more of silicon carbide (total mass) based on the partition wall 13 and the outer peripheral wall 12 of the honeycomb structure 10 as a whole.

Preferably, the partition wall 13 and the outer peripheral wall 12 of the honeycomb structure 10 are formed of at least one ceramic material selected from the group consisting of cordierite, silicon carbide, aluminum titanate, silicon nitride, mullite, and alumina.

The shape of each cell of the honeycomb structure 10 may be, but not particularly limited to, a polygonal shape such as a triangle, a quadrangle, a pentagon, a hexagon and an octagon; a circular shape; or an ellipse shape, or other irregular shapes, in a cross section orthogonal to the central axis of the honeycomb structure 10. Preferably, each cell has the polygonal shape.

The partition wall 13 of the honeycomb structure 10 preferably has a thickness of from 0.05 to 0.50 mm, and more preferably from 0.10 to 0.45 mm, in terms of ease of production. For example, the thickness of 0.05 mm or more improves the strength of the honeycomb structure 10. The thickness of 0.50 mm or less can result in low pressure loss. It should be noted that the thickness of the partition wall 13 is an average value measured by a method for observing the axial cross section with a microscope.

Further, the partition wall 13 preferably has a porosity of from 20 to 70%. The porosity is preferably 20% or more in terms of ease of production. The porosity of 70% or less can maintain the strength of the honeycomb structure 10.

The partition wall 13 preferably has an average pore size of from 2 to 30 μm, and more preferably from 5 to 25 μm. The average pore size of the partition wall of 2 μm or more results in easy production, and the average pore size of 30 μm or less can maintain the strength of the honeycomb structure 10. As used herein, the terms "average pore diameter" and "porosity" mean an average pore diameter and a porosity measured by mercury instruction technique.

The honeycomb structure 10 preferably has a cell density in a range of from 5 to 150 cells/cm$^2$, and more preferably 5 to 100 cells/cm$^2$, and even more preferably in a range of from 31 to 80 cells/cm$^2$, although not particularly limited thereto.

An outer shape of the honeycomb structure 10 may be, but not particularly limited to, a shape such as a pillar shape with circular end faces (cylindrical shape), a pillar shape with oval end faces, and a pillar shape with polygonal (quadrangular, pentagonal, hexagonal, heptagonal, octagonal, and the like) end faces, and the like.

Such a honeycomb structure 10 is produced by forming a green body containing a ceramic raw material into a honeycomb shape having a partition wall extending from one end face to other end face and defining a plurality of cells to form flow paths for a fluid to prepare a honeycomb formed body, and drying the honeycomb formed body and then firing it. When the resulting honeycomb structure is used for the honeycomb structure 10 according to the present embodiment, the outer peripheral wall may be integrally extruded with a honeycomb structure, which is used as the outer peripheral wall as it is, or an outer periphery of the honeycomb structure may be ground and shaped into a predetermined shape after forming or firing it, and a coating material may be applied to the outer periphery-ground honeycomb structure to form an outer peripheral coating. In this embodiment, for example, a honeycomb structure having an outer periphery without grinding the outermost circumference of the honeycomb structure may be used, and the coating material may be further applied onto the outer peripheral surface of the honeycomb structure having the outer periphery (that is, a further outer side of the outer periphery of the honeycomb structure) to form the outer coating. That is, in the former case, only the outer peripheral coating made of the coating material forms the outer peripheral surface positioned on the outermost circumference. On the other hand, in the latter case, an outer peripheral wall having a two-layered structure positioned on the outermost periphery is formed in which the outer peripheral coating made of the coating material is further laminated on the outer peripheral surface of the honeycomb structure. The outer peripheral wall may be extruded integrally with the honeycomb structure portion and fired as it is, which may be used as the outer peripheral wall without processing the outer periphery.

The honeycomb structure 10 is not limited to an integral type honeycomb structure in which the partition wall 13 is integrally formed. For example, the honeycomb structure 10 may be a honeycomb structure in which pillar shaped honeycomb segments each having a partition wall made of ceramics and a plurality of cells defined by the partition wall to form flow paths for a fluid are combined via joining material layers (joined honeycomb structure).

In the embodiment shown in FIGS. 1(A) and 1(B), the magnetic particles form a structure composed of coating layers 15 containing the magnetic particles. The coating layers 15 are provided on the partition wall 13 of the honeycomb structure 10. The coating layer 15 may contain a fixing material with the magnetic particles dispersed. The fixing material that can be used herein includes glass containing silicic acid, boric acid or borosilicate, crystallized glass, ceramics, or glass, crystallized glass, and ceramics containing other oxides, and the like. The glass that can be used herein includes preferably high melting point glass having a melting point of 900 to 1100° C. The use of the high melting point glass can improve the heat resistance of the coating layers 15. As described above, the coating layer 15 may be a layer containing the fixing material with the magnetic particles dispersed therein, or may be a layer in which magnetic particles are directly dispersed and supported on the partition wall 13 of the honeycomb structure 10.

The coating layer 15 preferably has a thickness of 10 to 100 μm. The thickness of the coating layer 15 of 10 μm or more allows more magnetic particles to be contained, resulting in an increased efficiency of heat generation by induction heating. The thickness of the coating layer 15 of 100 μm or less can lead to a decreased pressure loss.

The cells 11 in which the coating layers 15 containing the magnetic particles are provided on the partition wall 13 may be arranged in a staggered shape such that vertically and horizontally adjacent cells may be arranged at an interval of one cell, or may be arranged at intervals of a plurality of cells such as two cells and three cells. Also, the coating layers 15 containing the magnetic particles may be provided on the partition wall 13 of all the cells. The number or arrangement of the cells in which the coating layers 15 containing the magnetic particles are provided on the partition wall 13 is not limited, and it can be appropriately designed as needed. From the viewpoint of improving the heating effect, it is more desirable to increase the number of the cells in which the coating layers 15 containing the magnetic particles is provided on the partition wall 13, while from the viewpoint of reducing the pressure loss, it is more desirable to reduce the number of the cells as much as possible.

The coating layers 15 containing the magnetic particles provided on the partition wall 13 may be provided over the entire length of the honeycomb structure 10 from one end face to the other end face. They may also be provided from one end face of the honeycomb structure 10 to the middle of the cells 11.

As shown in FIG. 2(A) and FIG. 2(B), the magnetic particles may form a structure comprised of plugged portions 25 containing the magnetic particles. The plugged portions 25 may be provided at the cells 11 on one end face of the honeycomb structure 20, or at the cells 11 on one end face and the other end face. By forming the structure comprised of the plugged portions 25 containing the magnetic particles, it is no longer necessary to use the cells 11 of the honeycomb structure 20 only for filling a material containing the magnetic material, resulting in suppression of an increase in pressure loss.

When the plugged portions 25 are provided at the cells 11 on one end face and the other end face, the cells provided with the plugged portions 25 on one end face and the cells provided with the plugged portions 25 on the other end face may be alternately arranged adjacent to each other across the partition wall 13, so that both end faces form a staggered pattern. Such a honeycomb structure 20 can be used as a filter (honeycomb filter) for purifying an exhaust gas. The number, arrangement, or the like, of the cells provided with the plugged portions 25 on one end face and the other end face are not limited, and it can be appropriately designed as needed. The plugged portions 25 may be made of the same material as that forming the partition wall 13 or a material in which the magnetic particles are contained in other known material for the plugged portions 25.

Figure 3:
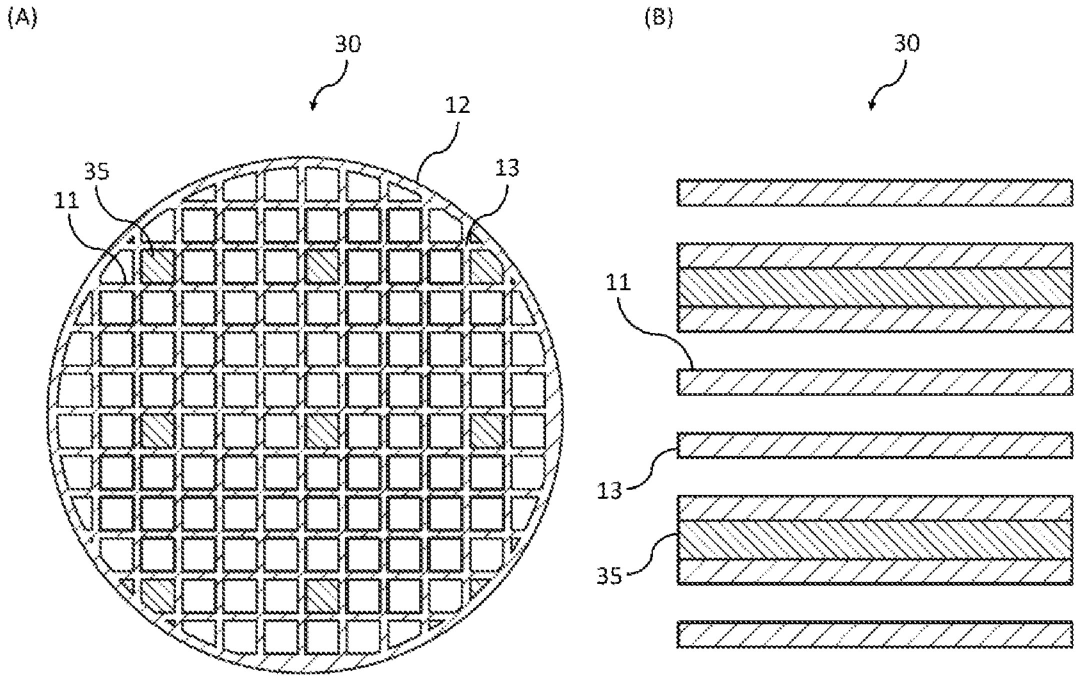
FIG. 3 (A) is a schematic cross-sectional view of a honeycomb structure 30 perpendicular to an extending direction of cells according to an embodiment of the present invention.

As shown in FIG. 3(A) and FIG. 3(B), the magnetic particles may form a structure composed of a filling material 35 containing the magnetic particles, which is filled in the cells 11 of the honeycomb structure 30. The cells 11 filled with the filling material 35 may be arranged in a staggered shape such that vertically and horizontally adjacent cells may be arranged at an interval of one cell, or may be arranged at intervals of a plurality of cells such as two cells and three cells, or may be continuously arranged. The number or arrangement of the cells filled with the filling material 35 containing the magnetic particles is not limited, and it can be appropriately designed as needed. From the viewpoint of improving the heating effect, it is more desirable to increase the number of the cells filled with the filling material 35 containing the magnetic particles, while from the viewpoint of reducing the pressure loss, it is more desirable to reduce the number of the cells as much as possible.

The filling material 35 may be composed of a composite composition of magnetic particles and a binding material or an adhesive material. Examples of the binding material include materials mainly based on a metal or glass. The adhesive material includes materials mainly based on silica or alumina. In addition to the binding material or the adhesive material, it may further contain an organic or inorganic substance.

The filling material 35 may be filled over the entire honeycomb structure 30 from one end face to the other end face. Alternatively, the filling material 35 may be filled from one end face of the honeycomb structure 30 to the middle of the cells 11.

Figure 4:
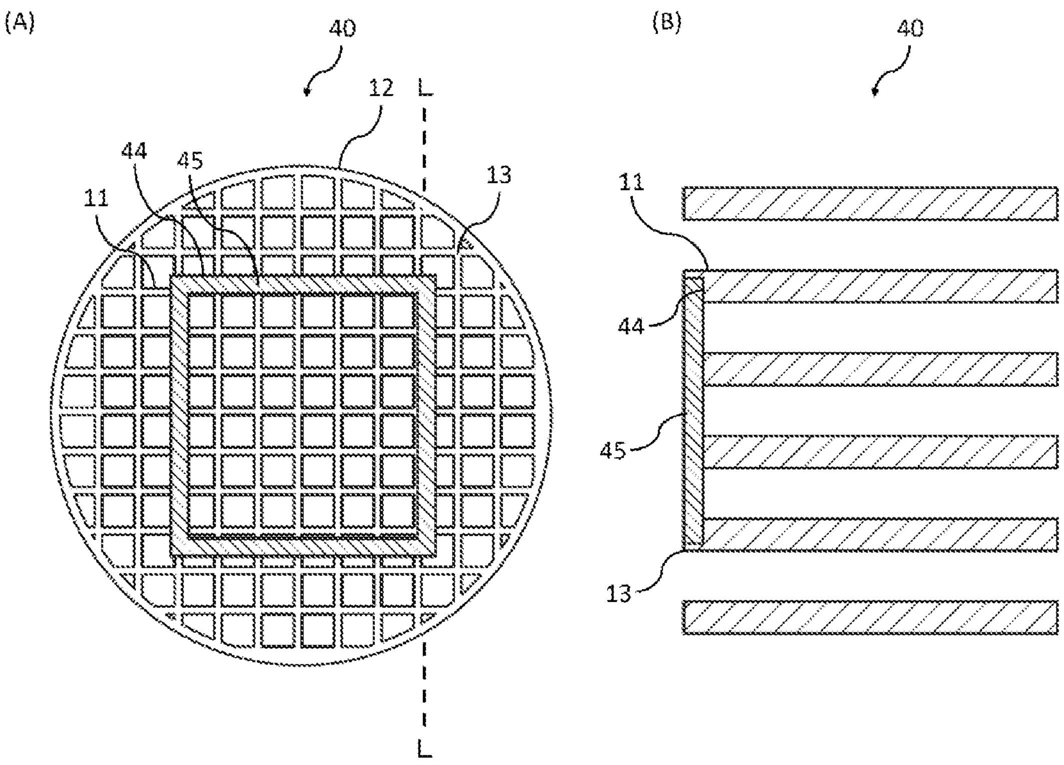
FIG. 4 (A) is a schematic cross-sectional view of a honeycomb structure 40 perpendicular to an extending direction of cells according to an embodiment of the present invention.

As shown in FIG. 4(A) and FIG. 4(B), the magnetic particles may form a structure comprised of at least one ring-shaped conductive loop 45 containing the magnetic particles. One or both of one end face and the other end face of the honeycomb structure 40 may be provided with a groove portion(s) 44, and the ring-shaped conductive loop 45 may be embedded in the groove portion 44. According to such a configuration, the shape of the conductive loop 45 is ring-shaped, so that the current tends to flow around the conductive loop 45 by induction heating, and eddy current tends to be generated. Due to the effect of reducing the resistivity in the conductive loop, the loss due to eddy current loss is more increased, so that the honeycomb structure 40 having a good heating rate even at a low frequency can be obtained.

The groove portion 44 is formed over the plurality of cells 11 of the honeycomb structure 40. The groove portion 44 is for embedding the conductive loop 45 as described above. Therefore, the depth of the groove portion 44 may be equal to or greater than the thickness of the conductive loop 45. Similarly, the shape, number, size, and the like, of the groove portion 44 may be formed so that the conductive loop 45 can be embedded therein, and may be formed depending on the shape, number, size, etc. of the conductive loop 45.

The thickness of the conductive loop 45 is preferably 0.1 to 5 mm. A larger eddy current can be generated if the thickness of the conductive loop 45 is 0.1 mm or more. If the thickness of the conductive loop 45 is 5 mm or less, the area of the portion that obstructs the gas flow can be reduced, so that the pressure loss can be further reduced. More preferably, the thickness of the conductive loop 45 is 0.5 to 4 mm, and even more preferably 1 to 3 mm.

The conductive loop 45 shown in FIG. 4(A) and FIG. 4(B) is formed in a substantially quadrangular ring shape centered at the center of the end face of the honeycomb structure 40. The size of the conductive loop 45 as viewed from the end face side of the honeycomb structure 40 is not particularly limited, and depends on the size of the end face of the honeycomb structure 40. In the case of the conductive loop 45 having the substantially quadrangular ring shape as shown in FIG. 4(A) and FIG. 4(B), the width of the conductive loop 45 is preferably 0.1 to 5 mm. A larger eddy current can be generated if the width of the conductive loop 45 is 0.1 mm or more. If the width of the conductive loop 45 is 5 mm or less, the pressure loss can be further reduced. More preferably, the width of the conductive loop 45 is 0.5 to 4 mm, and even more preferably 1 to 3 mm.

The conductive loop 45 is not limited to the quadrangular ring shape, and it may be formed in a circular, elliptical, triangular, or rectangular ring shape having five or more sides.

The conductive loop 45 may be a layer composed of a joining material containing the magnetic particles. Examples of the joining material that can be used herein include ceramics, glass, or a composite material of ceramics and glass. Examples of the composite material making up the joining material that can be used herein include a material containing 50% by volume or more, preferably 60% by volume or more, and even more preferably 70% by volume or more of glass. Examples of ceramics making up the joining material include ceramics such as $SiO_2$-based, $Al_2O_3$-based, $SiO_2$—$Al_2O_3$-based, $SiO_2$—$Al_2O_3$—MgO-based, $SiO_2$—$ZrO_2$-based, and $SiO_2$—$Al_2O_3$—$ZrO_2$-based ceramics. Examples of glass making up the joining material include glass such as lead-free $B_2O_3$—$Bi_2O_3$-based, $B_2O_3$—ZnO—$Bi_2O_3$-based, $B_2O_3$—ZnO-based, $V_2O_5$—$P_2O_5$-based, SnO—$P_2O_5$-based, SnO—ZnO—$P_2O_5$-based, $SiO_2$—$B_2O_3$—$Bi_2O_3$-based and $SiO_2$—$Bi_2O_3$—$Na_2O$-based glass.

Although the embodiment of the present invention has described the examples of forming the structure where the magnetic particles included in the honeycomb structure are composed of the coating layers 15, the structure where they are composed of the plugged portions 25, and the structure where they are composed of the filling material 35 filled in the cells of the honeycomb structure, and the structure where they are composed of the ring-shaped conductive loop 45, the present invention is not limited thereto, and the magnetic particles may form a structure in any form.

In the honeycomb structure, the object to be heated (magnetic particles) is in the form of particles, so that it is possible to suppress any impact on durability due to a difference in thermal expansion of the honeycomb structure comprising metal and ceramics, which enables the honeycomb structure to be flexibly supported on a position desired to be heated.

The magnetic particles include secondary particles to which primary particles are combined, and in a cross-sectional image of the honeycomb structure, a ratio of the number of the primary particles forming the secondary particles to the total number of the primary particles of the magnetic particles is 40 to 100%. Here, when the number of the primary particles forming the secondary particles is defined as n1 and the number of the primary particles that do not form the secondary particles is defined as n2, the "total number of the primary particles of the magnetic particles" is n1+n2. When the ratio of the number of the primary particles forming the secondary particles to the total number of the primary particles of the magnetic particles is 40% or more, the size of the loop formed by the eddy current generated in the magnetic particles provided in the honeycomb structure by induction heating is increased, resulting in improved induction heating characteristics. The ratio of the number of the primary particles forming the secondary particles is preferably 50% or more, and more preferably 60% or more. Although the upper limit is not particularly limited, it is preferably 90% or less, and more preferably 85% or less. The number of the primary particles that form the secondary particles and the number of the primary particles that do not form the secondary particles can be measured by analyzing cross-sectional images observed with a scanning electron microscope (SEM) or micro X-ray CT with known image analysis software or the like. For example, using a scanning electron microscope, a cross-sectional image containing the magnetic particles of the honeycomb structure is obtained, the above n1 and n2 are calculated in the range of 1700 μm×1400 μm, and the ratio of the number of the primary particles forming the secondary particles is calculated. The same measurements are performed in at least three positions, and the results are averaged to determine the ratio of the number the primary particles forming the secondary particles according to the present invention. The target range of the image analysis may be appropriately changed depending on the size of the primary particles. The primary particles forming the secondary particles mean the primary particles forming a neck portion.

The magnetic particles have a particle size D50 of 5 to 100 μm, which corresponds to a cumulative frequency of 50% by number for the primary particles. When the particle size D50 corresponding to the cumulative frequency of 50% by number for the primary particles of the magnetic particles is 5 μm or more, the particle size with respect to the skin depth is sufficiently large, so that the resistance can be increased and a sufficient heating effect can be obtained. When the particle size D50 corresponding to the cumulative frequency of 50% by number for the primary particles of the magnetic particles is 100 μm or less, the particles are easily sintered, the particles are bonded together, and the path through which the eddy current flows becomes large when the heat treatment is performed at 1000 to 1500° C. As a result, the resistance can be increased and a sufficient heating effect can be obtained. The particle size D50 corresponding to the cumulative frequency of 50% by number for the primary particles of the magnetic particles is preferably 10 to 80 μm, and more preferably 20 to 70 μm. The particle size D50 corresponding to the cumulative frequency of 50% by number for the primary particles of the magnetic particles can be measured by analyzing cross-sectional images observed with SEM or micro X-ray CT using known image analysis software or the like. For example, using a scanning electron microscope, a cross-sectional image of the honeycomb structure containing the magnetic particles is obtained, and the particle size of the primary particles is obtained in the range of 1700 μm×1400 μm, thereby calculating the particle size D50 corresponding to the cumulative frequency of 50% by number for the primary particles of the magnetic particles. The same measurements are performed in at least three positions and averaged to determine the particle size D50 according to the present invention. The target range of the image analysis may be appropriately changed depending on the size of the primary particles.

In the honeycomb structure according to the embodiment of the present invention, as described above, the ratio of the number of the primary particles forming secondary particles to the total number of the primary particles of magnetic particles is controlled to 40 to 100%, so that the loop path formed by the eddy current generated in the honeycomb structure by induction heating is lengthened. Also, by controlling the particle size D50 corresponding to the cumulative frequency of 50% by number for the primary particles of the magnetic particles to 5 to 100 μm, the loop path formed by the eddy current generated in the honeycomb structure by induction heating is thickened. As described above, since the loop path formed by the eddy current generated in the honeycomb structure by induction heating becomes long and thick, the heating characteristics can be improved by the good eddy current while reducing the skin depth through which the eddy current flows to increase the surface resistance of the honeycomb structure.

It is preferable that the particle size D10 corresponding to the cumulative frequency of 10% by number for the primary particles of the magnetic particles is 2 μm or more. When the particle size D10 corresponding to the cumulative frequency of 10% by number for the primary particles of the magnetic particles is 2 μm or more, the effect of forming the secondary particles of the magnetic particles increases. The particle size D10 corresponding to the cumulative frequency of 10% by number for the primary particles of the magnetic particles is more preferably 2 to 6 μm, and even more preferably 4 to 6 μm.

It is preferable that a particle size D90 corresponding to a cumulative frequency of 90% by number for the primary particles of the magnetic particles is 120 μm or less. When the particle size D90 corresponding to the cumulative frequency of 90% by number for the primary particles of the magnetic particles is 120 μm or less, the magnetic particles more easily form the secondary particles. The particle size D90 corresponding to the cumulative frequency of 90% by number for the primary particles of the magnetic particles is more preferably 20 to 120 μm, and even more preferably 20 to 100 μm. The particle size D10 corresponding to the cumulative frequency of 10% by number and the particle size D90 corresponding to the cumulative frequency of 90% by number for the primary particles of the magnetic particles can be measured by analyzing cross-sectional images observed with SEM or micro X-ray CT with known image analysis software or the like. For example, using a scanning electron microscope, a cross-sectional image of the honeycomb structure containing the magnetic particles is obtained, and the particle size of the primary particles is determined in the range of 1700 μm×1400 μm, thereby calculating the particle size D10 corresponding to the cumulative frequency of 10% by number for the primary particles and the particle size D90 corresponding to the cumulative frequency of 90% by number for the primary particles. The same measurements are performed in at least three positions, and averaged to determine the particle size D10 and the particle size D90 according to the present invention. The target range of the image analysis may be appropriately changed depending on the size of the primary particles.

Figure 5:
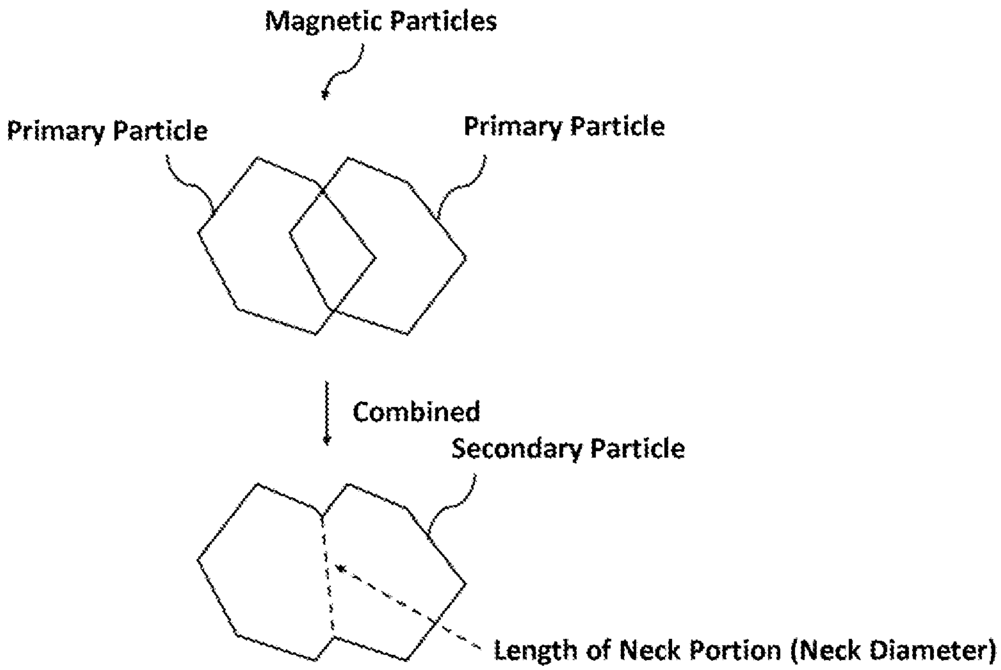
FIG. 5 is a schematic view for explaining a neck diameter of a secondary particle of magnetic particles.

It is preferable that a ratio of an average neck diameter Dn (μm) for the secondary particles of the magnetic particles to the particle size D50 (μm) corresponding to the cumulative frequency of 50% by number for the primary particles: Dn/D50 is 0.2 to 0.8. Here, as shown in FIG. 5, the average neck diameter Dn for the secondary particles of the magnetic particles is obtained as follows: when the primary particles are bonded to each other by sintering to form neck portions (recessed portion), lengths of the neck portions are defined as neck diameters, the neck diameters of a plurality of secondary particles are averaged, and the resulting value are determined to be the average neck diameter Dn. The average neck diameter Dn for the secondary particles can be measured by analyzing a cross-sectional image observed with SEM or micro X-ray CT using known image analysis software or the like. For example, using a scanning electron microscope, a cross-sectional image of the honeycomb structure containing the magnetic particles is obtained, the neck diameter Dn for the secondary particles is obtained in the range of 1700 μm×1400 μm, and the results are averaged to obtain the average neck diameter Dn according to the present invention. The neck diameter is measured by visually identifying the neck portion from the cross-sectional image and measuring a distance between two points from one end to the other end of the neck portion. The target range of the image analysis may be appropriately changed depending on the size of the primary particles.

A skin depth 5 of the honeycomb structure is a value determined by electrical resistivity, magnetic permeability and frequency of a conductor. As it has the same degree as the particle size D of the magnetic particles, the path through which the eddy current flows is more effectively ensured, and the loop path formed by the eddy current generated in the honeycomb structure by induction heating becomes thicker and larger due to connection of the magnetic particles to each other, thereby improving the heating characteristics. On the other hand, if the skin depth 5 of the honeycomb structure is much larger than the particle size D of the magnetic particles, the loop path formed by the eddy current generated in the honeycomb structure by induction heating becomes narrow, resulting in poor heating characteristics. Further, if the skin depth 5 of the honeycomb structure is much smaller than the particle size D of the magnetic particles, the sintering of the particles having a larger particle size is difficult to proceed, and the ratio of the primary particles increases, so that the loop path formed by the eddy current generated in the honeycomb by induction heating is shortened, resulting in poor heating characteristics. The ratio of the average neck diameter Dn (μm) for the secondary particles of the magnetic particles to the particle size D50 (μm) corresponding to the cumulative frequency of 50% by number for the primary particles: Dn/D50 is controlled to be 0.2 to 0.8, so that the loop path formed by the eddy current generated in the honeycomb structure by the induction heating becomes thicker and larger, resulting in better heating characteristics. The ratio Dn/D50 is more preferably 0.3 to 0.8, and even more preferably 0.4 to 0.8.

The structure of the magnetic particles preferably has a porosity of 10 to 70%. The porosity of the structure of the magnetic particles of 10% or more leads to a decreased Young's modulus of the structure and to a reduced thermal stress upon heating, so that the generation of cracks in the structure of the magnetic particles can be suppressed. The porosity of the structure of the magnetic particles of 70% or less results in improved bonding between the magnetic particles, increased resistance, sufficient heating, and improved strength. Therefore, it is possible to suppress the generation of cracks in the structure of the magnetic particles due to thermal stress upon heating. The porosity of the magnetic particle structure is more preferably 30 to 60%, and even more preferably 35 to 50%. The porosity of the structure of the magnetic particles can be measured by a mercury instruction technique. When the structure of the magnetic particles is the coating layer, it is difficult to measure the porosity by the mercury intrusion technique from the viewpoint of cutting out a sample. Therefore, in this case, it can be measured by image analysis of imaging with SEM or micro X-ray CT.

The magnetic particles are preferably magnetic particles that are induction-heated by an electric current having a frequency of 10 to 1000 kHz. Such a high-frequency current can reduce the skin (penetration) depth through which the eddy current flows in the honeycomb structure and increases the surface resistance, thereby improving the heating characteristics. Further, the frequency of the current for induction-heating of the magnetic particles of 10 kHz or higher can lead to sufficient heating even if the magnetic particles are in the form of powder having a low resistance. The frequency of the current for induction-heating of the magnetic particles of 1000 kHz or less can suppress an increase in a capacitor load for obtaining reactance and resonance in a coil. The frequency of the current for induction-heating of the magnetic particles is more preferably 100 to 600 kHz, and still more preferably 100 to 500 kHz.

The magnetic particles are magnetic materials, and are magnetized by a magnetic field, and a state of magnetization varies depending on the intensity of the magnetic field. This is represented by a "magnetization curve". The magnetization curve may have a magnetic field H on a horizontal axis and a magnetic flux density B on a vertical axis (B-H curve). A state where no magnetic field is applied to the magnetic material refers to a degaussing state, which is represented by an origin O. As a magnetic field is applied, a curve in which the magnetic flux density increases from the origin O to a saturated state is drawn. This curve is an "initial magnetization curve". A slope of a straight line connecting a point on the initial magnetization curve to the origin is a "magnetic permeability". The magnetic permeability indicates an ease of magnetization of the magnetic material in such a sense that the magnetic field permeates. The magnetic permeability near the origin where the magnetic field is smaller is an "initial magnetic permeability", and a magnetic permeability that is maximum on the initial magnetization curve is a "maximum magnetic permeability".

The magnetic particles preferably have a maximum magnetic permeability of 500 or more. According to such a configuration, when the honeycomb structure is subjected to the electromagnetic induction heating, the temperature can be raised in a short period of time until a temperature at which the catalyst is activated (about 300° C.).

The magnetic particles preferably have a Curie temperature of 450° C. or more. The Curie point of magnetic particles refers to a temperature at which they lose their ferromagnetic properties. Also, the magnetic particles preferably have an intrinsic resistance value of 20 μΩcm or more at 25° C. Also, the magnetic particles preferably have a coercive force of 40 A/m or more. According to such configurations, the temperature can be raised in a short period of time until a temperature at which the catalyst is activated (about 300° C.).

The types of the magnetic particles include, for example, the balance Co-20% by mass of Fe; the balance Co-25% by mass of Ni-4% by mass of Fe; the balance Fe-15-35% by mass of Co; the balance Fe-17% by mass of Co-2% by mass of Cr-1% by mass of Mo; the balance Fe-49% by mass of Co-2% by mass of V; the balance Fe-18% by mass of Co-10% by mass of Cr-2% by mass of Mo-1% by mass of Al; the balance Fe-27% by mass of Co-1% by mass of Nb; the balance Fe-20% by mass of Co-1% by mass of Cr-2% by mass of V; the balance Fe-35% by mass of Co-1% by mass of Cr; pure cobalt; pure iron; electromagnetic soft iron; the balance Fe-0.1-0.5% by mass of Mn; the balance Fe-3% by mass of Si; the balance Fe-6.5% by mass of Si; the balance Fe-18% by mass of Cr; the balance Fe-16% by mass of Cr-8% by mass of Al; the balance Ni-13% by mass of Fe-5.3% by mass of Mo; the balance Fe-45% by mass of Ni; the balance Fe-10% by mass of Si-5% by mass of Al; the balance Fe-36% by mass of Ni; the balance Fe-45% by mass of Ni; the balance Fe-35% by mass of Cr; the balance Fe-13% by mass of Cr-2% by mass of Si; the balance Fe-20% by mass of Cr-2% by mass of Si-2% by mass of Mo; the balance Fe-20% by mass of Co-1% by mass of V; the balance Fe-13% by mass of Cr-2% by mass of Si; the balance Fe-17% by mass of Co-2% by mass of Cr-1% by mass of Mo; and the like.

<Method for Producing Honeycomb Structure>

Next, the method for producing the honeycomb structure according to an embodiment of the present invention will be described. First, the honeycomb structure having the partition wall and the outer peripheral wall made of ceramics and the plurality of cells defined by the partition walls is produced. For example, when producing the honeycomb structure made of cordierite, a cordierite-forming raw material is firstly prepared as a green body. The cordierite-forming raw material contains a silica source component, a magnesia source component, and an alumina source component, and the like, in order to formulate each component so as to have a theoretical composition of cordierite crystal. Among them, the silica source component that can be used herein includes preferably quartz and fused silica, and the particle size of the silica source component is preferably from 100 to 150 μm.

Examples of the magnesia source component include talc and magnesite. Among them, talc is preferred. The talc is preferably contained in an amount of from 37 to 43% by mass in the cordierite-forming raw material. The talc preferably has a particle size (average particle size) of from 5 to 50 μm, and more preferably from 10 to 40 μm. Further, the magnesia (MgO) source component may contain $Fe_2O_3$, CaO, $Na_2O$, $K_2O$ and the like as impurities.

The alumina source component preferably contains at least one of aluminum oxide and aluminum hydroxide, in terms of fewer impurities. Further, aluminum hydroxide is preferably contained in an amount of from 10 to 30% by mass, and aluminum oxide is preferably contained in an amount of from 0 to 20% by mass, in the cordierite-forming raw material.

Materials for a green body to be added to the cordierite-forming raw material (additives) are then prepared. At least a binder and a pore former are used as additives. In addition to the binder and the pore former, a dispersant or a surfactant can be used.

The pore former that can be used herein includes a substance that can be oxidatively removed by reacting with oxygen at a temperature equal to or lower than a firing temperature of cordierite, or a low melting point reactant having a melting point at a temperature equal to or lower than the firing temperature of cordierite, or the like. Examples of the substance that can be oxidatively removed include resins (particularly particulate resins), graphite (particularly particulate graphite) and the like. Examples of the low melting point reactant that can be used herein include at least one metal selected from the group consisting of iron, copper, zinc, lead, aluminum, and nickel, alloys mainly based on those metals (e.g., carbon steel and cast iron for the iron, and stainless steel), or alloys mainly based on two or more of those metals. Among them, the low melting point reactant is preferably an iron alloy in the form of powder or fiber. Further, the low melting point reactant preferably has a particle size or a fiber diameter (an average diameter) of from 10 to 200 μm. Examples of a shape of the low melting point reactant include a spherical shape, a wound-lozenge shape, a confetti shape, and the like. These shapes are preferable because the shape of the pores can be easily controlled.

Examples of the binder include hydroxypropylmethyl cellulose, methyl cellulose, hydroxyethyl cellulose, carboxymethyl cellulose, polyvinyl alcohol and the like. Further, examples of the dispersant include dextrin, polyalcohol and the like. Furthermore, examples of the surfactant include fatty acid soaps. The additive may be used alone or in combination of two or more.

Subsequently, to 100 parts by mass of the cordierite-forming raw material are added from 3 to 8 parts by mass of the binder, from 3 to 40 parts by mass of the pore former, from 0.1 to 2 parts by mass of the dispersant, and from 10 to 40 parts by mass of water, and these materials for a green body are kneaded to prepare a green body.

The prepared green body is then formed into a honeycomb shape by an extrusion molding method, an injection molding method, a press molding method, or the like to obtain a raw honeycomb formed body. The extrusion molding method is preferably employed, because continuous molding is easy, and, for example, cordierite crystals can be oriented. The extrusion molding method can be performed using an apparatus such as a vacuum green body kneader, a ram type extrusion molding machine, a twin-screw type continuous extrusion molding machine, or the like.

The honeycomb formed body is then dried and adjusted to a predetermined size to obtain a honeycomb dried body. The honeycomb formed body can be dried by hot air drying, microwave drying, dielectric drying, drying under reduced pressure, vacuum drying, freeze drying and the like. It is preferable to perform combined drying of the hot air drying and the microwave drying or dielectric drying, because the entire honeycomb formed body can be rapidly and uniformly dried. Subsequently, the honeycomb dried body is fired to obtain a honeycomb fired body. The conditions for the above firing can be typically in an air atmosphere at a temperature of 1410 to 1440° C. for 3 to 15 hours, when the cordierite-forming raw material is used.

The magnetic particles are then provided on the honeycomb fired body. It should be noted that it may be a method of obtaining a honeycomb structure by sintering the honeycomb dried body provided with the magnetic particles after providing the magnetic particles on the honeycomb dried body. Here, each of production steps for various forms of structures of magnetic particles will be described.

(1) Case where the Magnetic Particles Form the Structure Composed of the Coating Layers, and the Coating Layers are Provided on the Partition Wall of the Cells First, a coating layer forming slurry is prepared from a material in which magnetic particles and a fixing material made of glass or the like are mixed. Specifically, for example, the magnetic particles and glass powder are mixed, and a binder, a dispersant, and water are blended to the mixture to prepare a coating layer forming slurry. The mixing ratio of the magnetic particles and the glass powder is 1:1 or more and 20:1 or less on a volume basis.

A part of the cells on the end face on the upstream side of the honeycomb fired body is then masked, and that end face is immersed in a storage container in which the coating layer forming slurry is stored to coat the unmasked cells. At this time, the coating layer forming slurry is applied from one end face of the honeycomb fired body to the entire interior of the cells or inside the cells in a region of a predetermined length. When the coating layers are formed on all the cells of the honeycomb structure, the coating layer forming slurry may be applied to the cells without applying the mask to the end face on the upstream side. A method of filling the slurry in the cells is simply carried out by pushing a paste-like material into the cells with a spatula such as a squeegee. It is easy to control the depth by the number of squeegee processes pushed. Alternatively, a method of vacuum-sucking the slurry from the other end face side and applying it to the interior of the cells is also considerable.

Subsequently, the honeycomb substrate provided with the slurry containing the magnetic particles is degreased by a heat treatment at 400 to 700° C. for 1 to 10 hours in the air atmosphere or in a nitrogen atmosphere, and after the degreasing, a heat treatment is carried out in a vacuum or an inert atmosphere at 900 to 1400° C. for 0.5 to 10 hours to produce a honeycomb structure in which the coating layers containing the magnetic particles are provided on the partition wall of the cells. By thus performing the degreasing by the heat treatment at 400 to 700° C. for 1 to 10 hours before the heat treatment is carried out, the carbon in the slurry is removed. After that, a heat treatment is carried out in a vacuum or an inert atmosphere at 900 to 1400° C. for 0.5 to 10 hours. For the magnetic particles, a method for controlling the ratio of the number of the secondary particles to 40 to 100% based on the total number of magnetic particles includes, for example, a method of performing the above heat treatment after the above degreasing step.

(2) Case where the Magnetic Particles Form the Structure Comprised of the Plugged Portions, and the Plugging Portions are Provided at the Cells on One End Face of the Honeycomb Structure First, a raw material for the plugged portions is prepared. The material for the plugged portions (plugging slurry) may use the same material for the green body as that of the partition wall (honeycomb fired body), or may use a different material. Specifically, the raw material for the plugged portions can be obtained by mixing a ceramic raw material, a surfactant, and water, and optionally adding a sintering aid, a pore former and the like to form a slurry, which is kneaded using a mixer or the like.

Subsequently, a mask is applied onto a part of cell opening portions on one end face of the honeycomb fired body, and that end face is immersed in a storage container in which the plugging slurry is stored to fill unmasked cells with the plugging slurry. A method of plugging is simply carried out by pushing a paste-like material into the cells with a spatula such as a squeegee. It is easy to control the depth by the number of squeegee processes pushed.

The honeycomb substrate provided with the slurry containing the magnetic particles is then degreased by a heat treatment at 400 to 700° C. for 1 to 10 hours in an air atmosphere or in a nitrogen atmosphere, and after the degreasing, a heat treatment is carried out in a vacuum or an inert atmosphere at 900 to 1400° C. for 0.5 to 10 hours to produce a honeycomb structure in which the plugged portions containing the magnetic particles are provided at the cells on the one end face.

(3) Case where the Magnetic Particles Form the Structure Composed of the Filling Material Filled in the Cells of the Honeycomb Structure First, the magnetic particles, a slurry containing the magnetic particles, or a slurry containing an adhesive material mainly based on silica or alumina and the magnetic particles is poured into the cells of the honeycomb fired body. At this time, the magnetic particles, the slurry containing the magnetic particles, or the slurry containing the adhesive material mainly based on silica or alumina and the magnetic particles is applied into the cells from one end face of the honeycomb fired body to the whole or into the cells in the region of the predetermined length. The slurry can be obtained by mixing ceramics, glass, or a composite material of ceramics and glass, a surfactant, and water, and optionally adding a sintering aid, a pore former and the like to form a slurry, which is kneaded using a mixer or the like. Alternatively, when the adhesive material mainly based on silica or alumina is used, it is preferable that the adhesive material can be solidified by heating and drying during production. The adhesive material that can be solidified by heating and drying includes, for example, a colloidal dispersion of silica or alumina, or may be a colloidal dispersion containing silica and alumina. Further, since the maximum temperature in the usage environment reaches about 700° C., it is more preferable to use silica or alumina having a heat resistance temperature higher than or equal to that temperature.

The honeycomb substrate provided with the slurry containing the magnetic particles is then degreased by a heat treatment at 400 to 700° C. for 1 to 10 hours in an air atmosphere or in a nitrogen atmosphere, and after the degreasing, a heat treatment is carried out in a vacuum or an inert atmosphere at 900 to 1400° C. for 0.5 to 10 hours to produce a honeycomb structure in which the filling material containing the magnetic particles is filled in the cells.

(4) Case where the Magnetic Particles Form the Structure Composed of the Ring-Shaped Conductive Loop, the Groove Portion is Provided on One End Face of the Honeycomb Structure, and the Ring-Shaped Conductive Loop is Embedded in the Groove Portion First, one end face of the honeycomb fired body is cut and removed by a predetermined depth to form a groove portion. Alternatively, a raw honeycomb formed body having a groove portion formed therein is prepared in advance, and dried to prepare a honeycomb dried body.

A slurry containing the magnetic particles is then poured into the groove portion. The slurry can be obtained by mixing ceramics, glass, or a composite material of ceramics and glass, a surfactant, and water, and optionally adding a sintering aid, a pore former and the like to form a slurry, which is kneaded using a mixer or the like.

In addition to the method of pouring the slurry into the groove portion, a step of applying a slurry containing a joining material and the magnetic particles to previously segmented honeycombs so that each ring-shaped conductive loop is formed, and joining and integrating the segments can also provide a similar honeycomb structure.

The honeycomb substrate provided with the slurry containing the magnetic particles is then degreased by a heat treatment at 400 to 700° C. for 1 to 10 hours in an air atmosphere or in a nitrogen atmosphere, and after the degreasing, a heat treatment is carried out in a vacuum or an inert atmosphere at 900 to 1400° C. for 0.5 to 10 hours to produce a honeycomb structure in which the ring-shaped conductive loop containing the magnetic particles is embedded in the groove portion.

<Exhaust Gas Purification Device>

Figure 6:
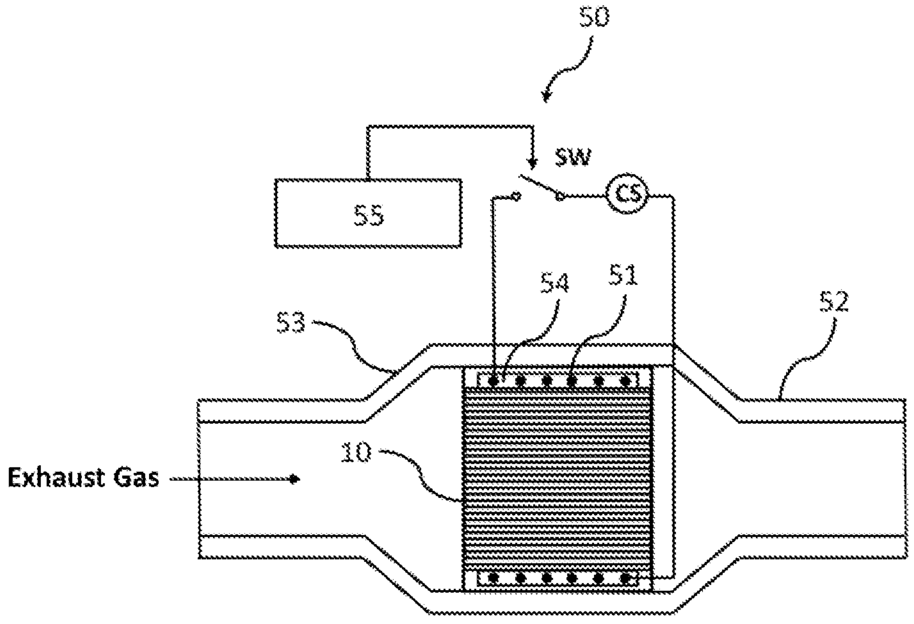
FIG. 6 is a schematic cross-sectional view of an exhaust gas purification device parallel to a gas flow direction according to an embodiment of the present invention.

Using the honeycomb structure according to the embodiment of the present invention as described above, an exhaust gas purification device 50 can be formed. As shown in FIG. 6, the exhaust gas purification device 50 according to the embodiment of the present invention has the honeycomb structure 10 and a coil 51 provided on the outer periphery of the honeycomb structure 10. The exhaust gas purification device 50 also has a cylindrical member 52 for holding the honeycomb structure 10. The cylindrical member 52 can be made of a metal pipe or the like, and the honeycomb structure 10 can be arranged in an increased diameter portion 53. The coil 51 may be fixed to the interior of the cylindrical member 52 by a fixing member 54. The fixing member 54 is preferably a heat-resistant member such as ceramic fiber. The honeycomb structure 10 may support a catalyst. The catalyst that can be used herein may be at least one selected from the group consisting of an oxidation catalyst, a three-way catalyst, a $NO_x$ storage reduction catalyst, a $NO_x$ selective reduction catalyst (SCR catalyst), a hydrocarbon adsorption catalyst, a hydrocarbon, carbon monoxide oxidation catalyst, and an ammonia slip (oxidation) catalyst.

The coil 51 is spirally wound around the outer periphery of the honeycomb structure 10. It is also assumed that two or more coils 51 are used. An AC current supplied from an AC power supply CS flows through the coil 51 in response to turning on (ON) of a switch SW, and as a result, a magnetic field that periodically changes is generated around the coil 51. The on/off of the switch SW is controlled by a control unit 55. The control unit 55 can turn on the switch SW in synchronization with the start of an engine and pass an alternating current through the coil 51. It is also assumed that the control unit 55 turns on the switch SW regardless of the start of the engine (for example, in response to an operation of a heating switch pushed by a driver).

In the embodiment of the present invention, a temperature of the honeycomb structure 10 is increased in response to the change of the magnetic field according to the alternating current flowing through the coil 51. Based on this, carbon fine particles and the like collected by the honeycomb structure 10 are burned out. Also, when the honeycomb structure 10 supports the catalyst, the increase in the temperature of the honeycomb structure 10 raises a temperature of the supported catalyst and promotes the catalytic reaction. Briefly, carbon monoxide (CO), nitrogen oxide ($NO_x$), and hydrocarbon (CH) are oxidized or reduced to carbon dioxide ($CO_2$), nitrogen ($N_2$), and water ($H_2O$).

EXAMPLES

Hereinafter, the present invention will be specifically described based on Examples. However, the present invention is not limited to Examples.

Example 1

1.5 g of magnetic powder having a composition of the balance Fe-18% by mass of Cr and an average particle diameter of 10 μm was mixed with glass frits having an average particle diameter of 2 μm at a mass ratio of 9:1. Further, a rheology imparting agent for adjusting the viscosity of the slurry, carboxymethyl cellulose, and water were mixed to prepare a slurry, which was stored in a storage container.

Figure 2:
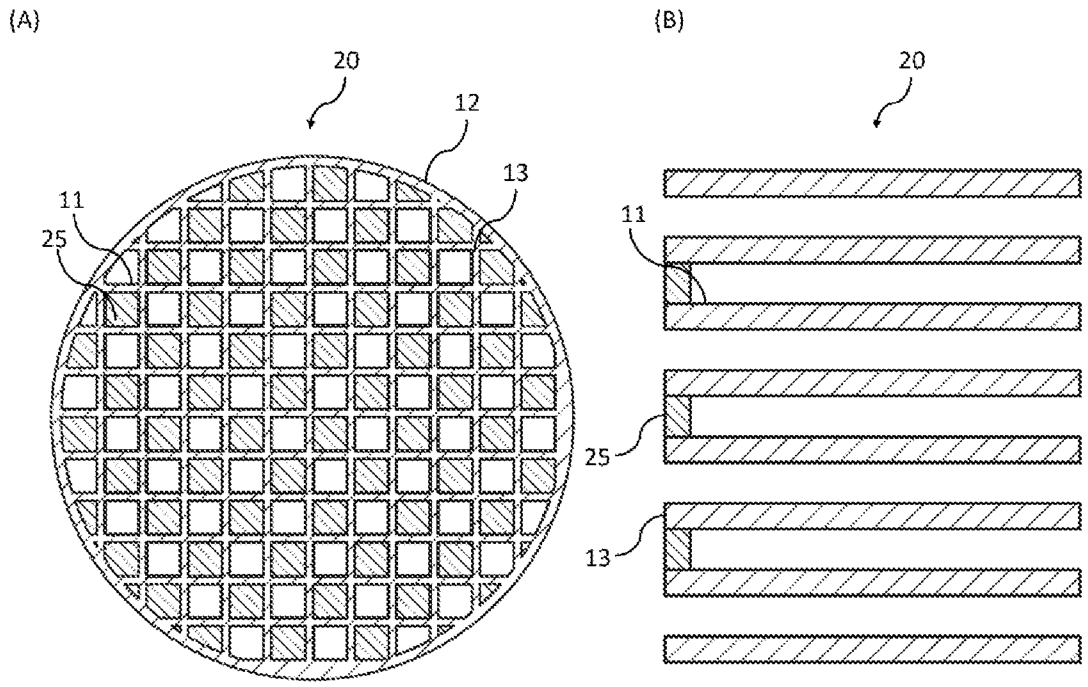
FIG. 2 (A) is a schematic cross-sectional view of a honeycomb structure 20 perpendicular to an extending direction of cells according to an embodiment of the present invention.

Separately, a cylindrical cordierite honeycomb fired body having a diameter of 25 mm, a length of 25 mm, a thickness of the partition wall of 0.1 mm, and a partition wall distance of about 1 mm was prepared. A part of the cell openings on one end face of the honeycomb fired body was then masked, and that end face was immersed in the storage container in which the slurry (plugging slurry) was stored, and unmasked cells were filled with the slurry. The honeycomb fired body filled with the slurry was degreased in a nitrogen atmosphere at 500° C. for 5 hours, and a heat treatment was then performed in a vacuum atmosphere at 1100° C. for 5 hours to produce a honeycomb structure having a structure composed of plugged portions containing magnetic particles as shown in FIG. 2 (A) and FIG. 2 (B). The porosity of the resulting structure comprised of the plugged portions containing the magnetic particles for the honeycomb structure was 45% as measured by a method of image analysis of SEM imaging.

<Induction Heating Test>

Figure 7:
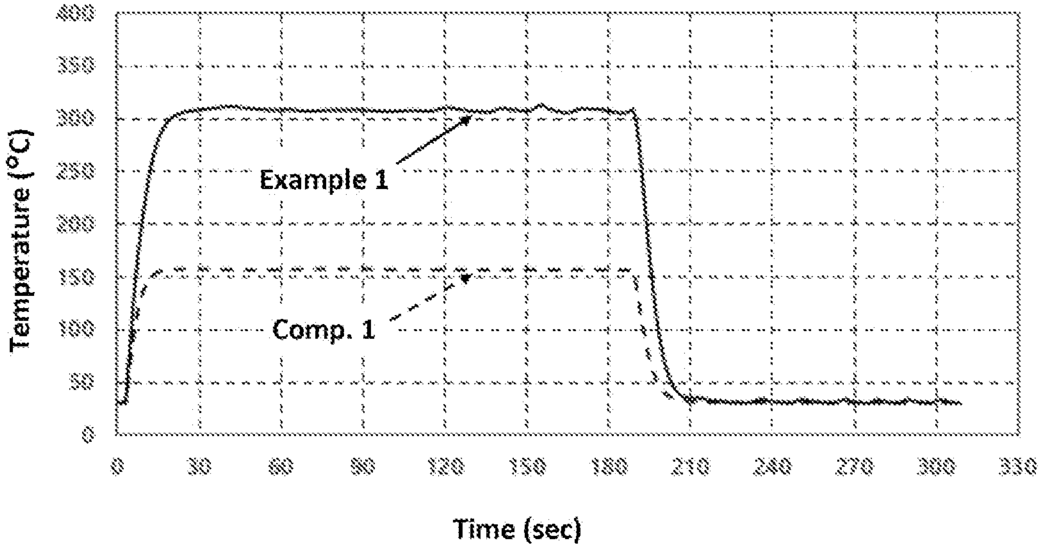
FIG. 7 is a graph showing results of induction heating tests according to Examples and Comparative Examples.

The honeycomb structure was then placed in a quartz glass tube having an inner diameter of 27 mm, and an air atmosphere at room temperature was blown into the quartz glass tube at 0.24 L/sec. Subsequently, an induction heating coil having a diameter of 35 mm and a number of windings of 3 was wound around the outer side, and a heating test of the honeycomb structure was then conducted using an induction heating device. The temperature of the interior of the honeycomb structure was measured with a sheathed thermocouple. The temperature-increasing performance of the honeycomb structure was measured at a power input of 1 kW and an induction heating frequency of 450 kHz. FIG. 7 shows a graph showing the relationship between time (seconds) and temperature (° C.) according to the induction heating test of Example 1.

Also, the honeycomb structure used for this measurement was subjected to SEM observation, and an image was taken at magnifications of 70. Image analysis was performed using three photographs in a field of view of 1700 μm×1400 μm.

The D50 obtained by the image analysis was 10 μm, the D10 was 4 μm, the D90 was 27 μm, and the ratio of the number of the primary particles forming the secondary particles to all the primary particles was 70%. Also, the ratio of the average neck diameter Dn for the secondary particles to the D50 of the primary particles: Dn/D50 was 0.4.

Example 2

A honeycomb structure was produced by the same method as of Example 1, with the exception that the heat treatment was performed in a vacuum atmosphere at 1350° C. for 5 hours.

Example 3

A honeycomb structure was produced by the same method as of Example 1, with the exception that the heat treatment was performed in a vacuum atmosphere at 950° C. for 1 hour.

Example 4

A honeycomb structure was produced by the same method as that of Example 1, with the exception that 1.5 g of magnetic powder having a composition of the balance Fe-18% by mass of Cr and an average particle size of 6 μm was used as the magnetic powder.

Example 5

A honeycomb structure was produced by the same method as that of Example 1, with the exception that 1.5 g of magnetic powder having a composition of the balance Fe-18% by mass of Cr and an average particle size of 80 μm was used as the magnetic powder.

Comparative Example 1

As in Example 1, the slurry of Example 1 wad filled in predetermined cells of a cylindrical cordierite honeycomb fired body having a diameter of 25 mm, a length of 25 mm, a partition wall thickness of 0.1 mm, and a partition wall distance of about 1 mm to produce a honeycomb fired body having a structure comprised of plugged portions containing magnetic particles. The honeycomb fired body with the slurry applied to the interior of the cells was subjected to a heat treatment at 1100° C. for 5 hours in a vacuum atmosphere without degreasing. The subsequent heating test was conducted by the same method as that of Example 1. FIG. 7 shows a graph showing the relationship between time (seconds) and temperature (° C.) according to the induction heating test of Comparative Example 1. The D50 obtained by image analysis was 10 μm, the D10 was 4 μm, the D90 was 27 μm, and the ratio of the number of the primary particles forming the secondary particles to all the primary particles was 20%. The ratio of the average neck diameter Dn for the secondary particles to the D50 of the primary particles: Dn/D50 was 0.1. Table 1 shows the evaluation results of Examples 1 to 5 and Comparative Example 1.

TABLE 1

| | Ratio of Number of Primary Particles (%) | D50 (μm) | D10 (μm) | D90 (μm) | Dn/D50 | Induction Heating Test Maximum Temperature (° C.) |
|---|---|---|---|---|---|---|
| Example 1 | 70 | 10 | 4 | 27 | 0.4 | 310 |
| Example 2 | 85 | 10 | 4 | 27 | 0.7 | 340 |

TABLE 1-continued

| | Ratio of Number of Primary Particles (%) | D50 (μm) | D10 (μm) | D90 (μm) | Dn/D50 | Induction Heating Test Maximum Temperature (° C.) |
|---|---|---|---|---|---|---|
| Example 3 | 45 | 10 | 4 | 27 | 0.1 | 280 |
| Example 4 | 75 | 6 | 1 | 15 | 0.5 | 280 |
| Example 5 | 50 | 80 | 30 | 130 | 0.2 | 290 |
| Comp. 1 | 20 | 10 | 4 | 27 | 0.1 | 160 |

DISCUSSION

In each of Examples 1 to 5, the ratio of the number of the primary particles forming the secondary particles to the total number of the primary particles of the magnetic particles is in the range of 40 to 100%, and the particle size D50 corresponding to the cumulative frequency of 50% by number for the primary particles is controlled to the range of 5 to 100 μm. Examples 1 to 5 had good heating characteristics by induction heating.

On the other hand, in Comparative Example 1, the ratio of the number of the primary particles forming the secondary particles to the total number of the primary particles of the magnetic particles was outside the range of 40% to 100%. Comparative Example 1 was inferior to Examples 1 to 5 for the heating characteristics by induction heating.

Further, in Comparative Example 1, the ratio of the number of the primary particles forming the secondary particles is lower than that in Example 1. This would be because, for example, by omitting the degreasing step, the subsequent sintering of the primary particles was hindered due to the residual carbon content.

Furthermore, as shown in FIG. 7, when comparing Example 1 with Comparative Example 1, it is found that Example 1 results in faster heating under conditions where the weight of the magnetic material used for the composite material and the honeycomb structure to be heated are the same, and the input power for induction heating is the same, which indicates that it is effective in efficiently increasing the temperature of the gas passing through the portion where the composite material containing the magnetic material in the honeycomb structure is present. Further, it is found that the maximum temperature in Example 1 exceeds 200° C., which is an effective heating temperature for activating the selective reduction catalyst effective to purifying $NO_x$, for example.

DESCRIPTION OF REFERENCE NUMERALS

- 10, 20, 30, 40 honeycomb structure
- 11 cell
- 12 outer peripheral wall
- 13 partition wall
- 15 coating layer
- 25 plugged portion
- 35 filling material
- 44 groove portion
- 45 conductive loop
- 50 exhaust gas purification device
- 51 coil
- 52 cylindrical member
- 53 increased diameter portion
- 54 fixing member
- 55 control unit

The invention claimed is:

1. A honeycomb structure comprising: an outer peripheral wall; a partition wall disposed on an inner side of the outer peripheral wall, the partition wall defining a plurality of cells, each of the cells extending from one end face to other end face to form a flow path; and magnetic particles, wherein the magnetic particles comprise secondary particles with primary particles combined, wherein in a cross-sectional image of the honeycomb structure, a ratio of a number of the primary particles forming the secondary particles to a total number of the primary particles of the magnetic particles is 40 to 100%, and wherein a particle size D50 corresponding to a cumulative frequency of 50% by number for the primary particles is 5 to 100 μm.

2. The honeycomb structure according to claim 1, wherein a particle size D10 corresponding to a cumulative frequency of 10% by number for the primary particles is 2 μm or more, and a particle diameter D90 corresponding to a cumulative frequency of 90% by number for the primary particles is 120 μm or less.

3. The honeycomb structure according to claim 1, wherein a ratio of an average neck diameter Dn for the secondary particles of the magnetic particles and the D50 for the primary particles: Dn/D50 is 0.2 to 0.8.

4. The honeycomb structure according to claim 1, wherein the magnetic particles form a structure comprising coating layers containing the magnetic particles, and the coating layers are provided on a surface of the partition wall of the honeycomb structure.

5. The honeycomb structure according to claim 1, wherein the magnetic particles form a structure comprising plugged portions containing the magnetic particles, and the plugged portions are provided at the cells on one end face of the honeycomb structure, or at the cells on the one end face and the other end face of the honeycomb structure.

6. The honeycomb structure according to claim 1, wherein the magnetic particles form a structure comprising a filling material containing the magnetic particles, the magnetic particles being filled in the cells of the honeycomb structure.

7. The honeycomb structure according to claim 1, wherein the magnetic particles form a structure comprising at least one ring-shaped conductive loop containing the magnetic particles, and one or both of the one end face and the other end face of the honeycomb structure is/are provided with a groove portion(s), and the ring-shaped conductive loop is embedded in the groove portion.

8. The honeycomb structure according to claim 4, wherein the structure of the magnetic particles has a porosity of 10 to 70%.

9. The honeycomb structure according to claim 1, wherein the magnetic particles are magnetic particles that are induction-heated by an electric current having a frequency of 10 to 1000 kHz.

10. An exhaust gas purification device, comprising:

the honeycomb structure according to claim 1;

a coil provided on an outer periphery of the honeycomb structure; and a cylindrical member for holding the honeycomb structure.

11. A method for producing the honeycomb structure according to claim 1, comprising the steps of:

preparing a honeycomb substrate comprising: an outer peripheral wall; and a partition wall disposed on an inner side of the outer peripheral wall, the partition wall defining a plurality of cells, each of the cells extending from one end face to other end face to form a flow path;

providing the honeycomb substrate with a slurry containing magnetic particles;

degreasing the honeycomb substrate provided with the slurry containing the magnetic particles by a heat treatment at 400 to 700° C. for 1 to 10 hours; and after the degreasing, performing a heat treatment at 900 to 1400° C. for 0.5 to 10 hours in a vacuum or an inert atmosphere.

* * * * *